United States Patent [19]

Ellis

[11] Patent Number: 4,553,895
[45] Date of Patent: Nov. 19, 1985

[54] TRUCK LATCH

[75] Inventor: Lawrence D. Ellis, Monrovia, Calif.

[73] Assignee: Ellis Industries, Inc., South El Monte, Calif.

[21] Appl. No.: 605,213

[22] Filed: Apr. 30, 1984

[51] Int. Cl.$^4$ .............................................. B65G 67/02
[52] U.S. Cl. .................................... 414/401; 14/71.1; 340/687
[58] Field of Search ...................... 414/396, 401, 584; 14/71.1, 71.3, 71.5; 410/7, 18; 340/686, 687

[56] References Cited

U.S. PATENT DOCUMENTS 4,208,161 6/1980 Hipp et al. .......................... 414/401

OTHER PUBLICATIONS

Rite–Hite Co. of Milwaukee, Wis., literature on "Dok--Lok" Restraining Device–dated 10/80 (4 sheets).
Rite–Hite Co., of Milwaukee, Wis. literature on MDL–55 Manual "Dok–Lok"–dated 7/81 (1 sheet).
Kelley Company, Inc. literature on "Truck Stop'-'–Automatic Trailer Restraining Device–dated 10/82 (2 sheets).

*Primary Examiner*—Robert G. Sheridan
*Attorney, Agent, or Firm*—Edward J. DaRin

[57] ABSTRACT

A truck latch for use with a motor vehicle equipped with an ICC bumper or bar for restraining the unexpected departure of the motor vehicle. The truck latch is securable to a loading dock for coaction with the ICC bumper for a motor vehicle parked adjcent thereto. The truck latch is in the form of a tubular latch element having a hook-like restraining device extending therefrom. The latch element is vertically mounted to be bidirectionally axially movable and rotatable in a tubular supporting structure to be positioned in a coupled or de-coupled relationship with the ICC bumper. The latched condition of the truck latch may be electrically signalled by a switching element located to sense the travel of the latch element and to be operated thereby when the latch is coupled to the bumper.

14 Claims, 7 Drawing Figures

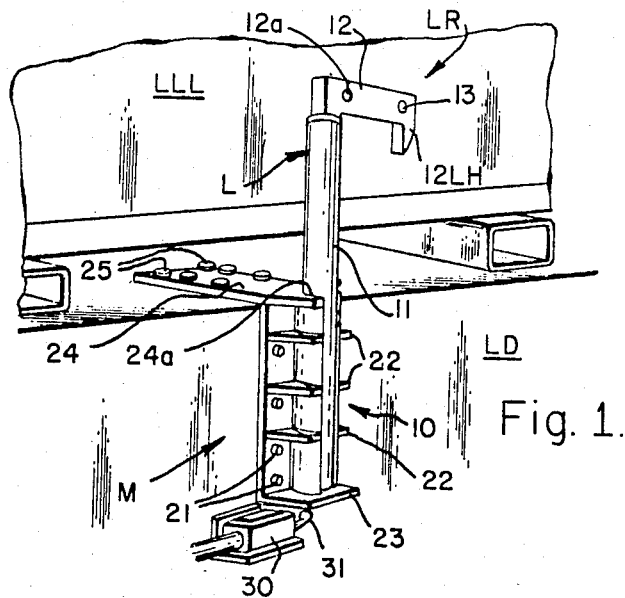
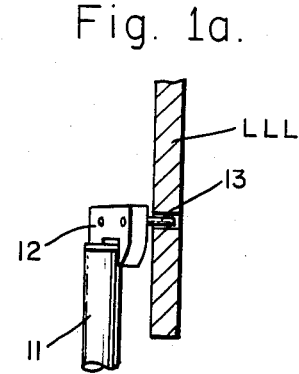
Fig. 1.
Fig. 1a.
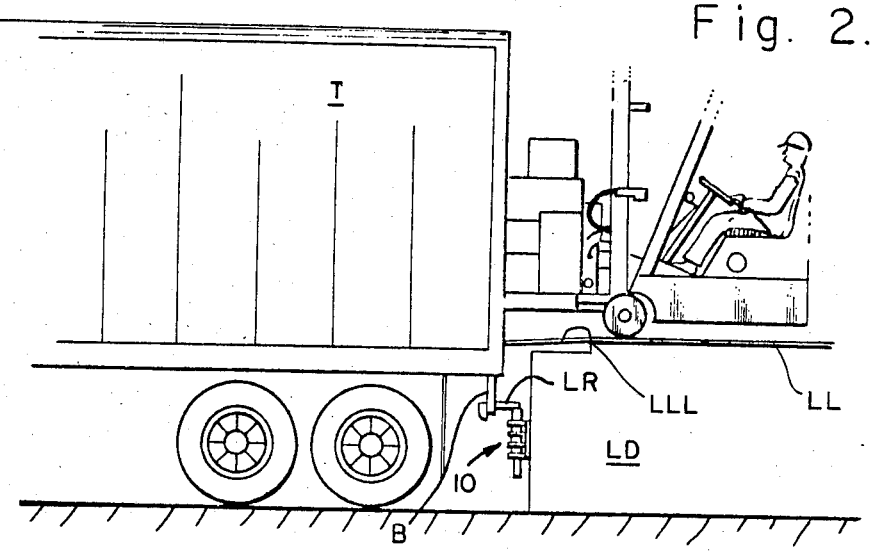
Fig. 2.
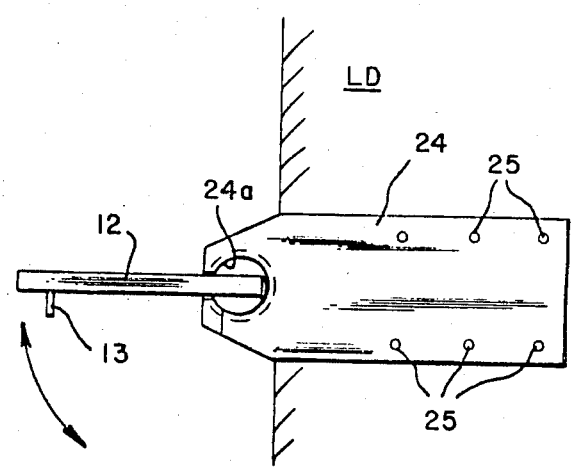
Fig. 3.

DOCK LEVELER CONTROLS

4,553,895

TRUCK LATCH

FIELD OF INVENTION

This invention relates to a truck latch and more particularly to a device for releasably restraining a motor vehicle, such as a truck or trailer parked adjacent a loading dock to prevent the unexpected departure of the parked vehicle away from the loading dock, including during the loading and unloading of the motor vehicle from the loading dock.

BACKGROUND OF INVENTION

Motor vehicles of the truck or trailer type are generally backed up to a loading dock for loading and unloading the truck or trailer at the loading dock. Loading docks may also be provided with manually or hydraulically operated load levelers which include a lip to bridge the gap between the motor vehicle and the top of the loading dock. The load levelers are controllable to position a loading lip member partially into the motor vehicle at an elevational level to allow relatively smooth travel between the loading dock and the inside of the motor vehicle. The use of load levelers also permits the use of material handling devices, such as fork lift trucks, or the like, for the loading and unloading operations. It is known that a motor vehicle parked adjacent the loading dock may be inadvertently or unexpectedly moved away from the loading dock during the loading and unloading operations resulting in damage to equipment and injury to personnel. Conventionally, the undesired movement is prevented by the use of wheel chocks secured under the tires of the motor vehicle for restraining the movement of the motor vehicle. Failure to utilize the wheel chocks by the motor vehicle operator and problems experienced therewith has resulted in the development of a restraining device for mechanically engaging and disengaging the bumper of a truck or trailer. For this purpose, the Interstate Commerce Commission, ICC, specifies a type of bumper or bar that must be secured to the rear of the truck or trailer to prevent low profile vehicles from running completely under the vehicle in rear end collisions. The ICC bars or bumpers have been found useful with the aforementioned mechanical restraining devices. The bumper or bar permits a mechanical hook or the like to be positioned into engagement with the bumper for restraining the movement of the motor vehicle when the two are interlocked. These prior art restraining devices are normally secured to the side wall of the loading dock and are adapted to be moved into a restraining position with the bumper. One such prior art restraining device is disclosed in U.S. Pat. No. 4,208,161. The patented restraining device is secured to a loading dock in a fixed position and is manually operative to interlock with an ICC bumper. The device is completely mechanical and is moved under the ICC bumper to a restraining position therewith. Other commercially available devices are movable along the side wall of the loading dock to move underneath the ICC bumper for releasably interlocking a hook-like member with the bumper. Signalling devices are also in use in combination with the motor vehicle restraining devices for signalling the condition of the restraining device, in storage or use, to permit the motor vehicle operator and/or personnel loading or unloading the motor vehicle to be aware of the actual condition of the restraining device from their work stations or from the motor vehicle by viewing the signalling device or display device. The operation of such restraining devices has also been integrated with the use of hydraulically operated load levelers for the loading dock. All presently known restraining devices protrude forwardly of the loading dock in the path of the travel of the motor vehicles to and from the loading dock.

SUMMARY OF INVENTION

The present invention provides an improved, relatively inexpensive truck latch or restraining device that is readily securable to the side wall of a loading dock and does not protrude outwardly of the loading dock when it is in its storage position or released from the motor vehicle. When in use, the truck latch does not protrude beyond the ICC type of bumper or restraining bar secured to the rear of the motor vehicle parked adjacent a loading dock. The truck latch is rotatable into and out of the path of the motor vehicle bumper to allow it to be engaged and disengaged therewith. The truck latch of the present invention is useful with either a mechanically or hydraulically operated loading dock leveler. The truck latch may be advantageously arranged in a restraining position relative to a loading lip to prevent the use of a mechanically operated load leveler until the truck latch is engaged with a vehicle bumper and thereby removing any restraint to the use of the mechanically operated load leveler. When the truck latch is used with a hydraulic load leveler, the latch is constructed and defined to provide an electrical control signal indicative of the latched condition thereof for automatically locking out the operation of the hydraulic load leveler when the truck latch is in an unlatched condition and allows operation thereof when coupled to the truck bumper. The electrical control signal also can be utilized to control a visual display device for signalling the actual condition of the truck latch relative to the ICC bumper to the motor vehicle operator and/or the personnel loading or unloading the motor vehicle. The truck latch includes a bypass groove to allow the hydraulic load leveler to be operated when the motor vehicle is not equipped with an ICC bumper, an inaccessible bumper, or under emergency conditions.

From a broad structural standpoint, the present invention comprehends a device for restraining a motor vehicle having a predetermined style bumper by releasably coupling the bumper to a loading dock. The device comprises latching means having a restraining member extending outwardly therefrom and adapted for sliding and rotary movement to position the restraining member over the bumper to releasably interlock with said bumper upon engagement therewith and slidable out of engagement with said bumper for releasing it. The device includes means for mounting the latching means to permit the latching means to be bidirectionally axially movable and rotatable relative to the mounting means to permit the latching means to engage and disengage the bumper. The mounting means permits the latching means to be rotated to a storage position out of the path of the motor vehicle bumper. The mounting means includes means for securing it to a loading dock at a preselected location on the side wall thereof for operative relationship with a motor vehicle equipped with the ICC bumper.

From a specific standpoint, the present invention comprehends a restraining device adaped to be mounted to a loading dock for use in conjunction with a truck or trailer parked adjacent the dock. The truck or trailer is provided with a predetermined style of bumper secured thereto (ICC bumper) to prevent the unexpected departure of the parked truck or trailer away from the loading dock, including during the loading or unloading of the truck or trailer. The restraining device comprises means for mounting the restraining device to the loading dock. The mounting means is constructed and defined for defining a tubular supporting structure extending vertically thereon when mounted to a loading dock. The device includes latching means comprising a tubular member sized to be slidably and rotatably mounted in the tubular supporting structure for the mounting means and a latch element secured adjacent one end of the tubular element and extending outwardly from the longitudinal axis of the tubular supporting structure and the mounting means. The latching means is capable of being axially movable in the tubular configuration for the mounting means and rotatable therein to permit the latch element to be positioned over and then coupled to the ICC bumper for a truck or trailer parked adjacent the loading dock in a restraining position with the bumper to prevent the unexpected departure of the truck or trailer away from the loading dock and permit the latch element to be movable away from the bumper restraining position to decouple the bumper and thereby release the truck or trailer from said latching means. The latching means is normally positioned with the latch element rotated to a storage position substantially aligned with the loading dock so as not to protrude forwardly from the mounting means and into the path of travel of the motor vehicle that is being loaded or unloaded at the dock.

In one specific embodiment of the invention for adapting it for use with the hydraulic load leveler the restraining device includes switching means comprising electromechanical switching means having a sensing arm extending outwardly therefrom to engage the tubular latching member for operating the switching means to provide an electrical signal therefrom. The sensing arm is positioned in the path of travel of the latching member to be movable when engaged by the tubular element for operating the switching means to provide the electrical signal. The sensing arm is arranged to normally be spaced from the tubular latching member when the latch element is in a storage position and the switching means is inoperative. The electrical signal may be utilized for controlling the operation of the load leveler.

BRIEF DESCRIPTION OF THE DRAWINGS

These and other features of the present invention may be more fully appreciated when considered in the light of the following specification and drawings in which:

FIG. 1 is a perspective view of the truck latch secured to the side wall of a loading dock and illustrating the truck latch in its storage position and secured to the lip of a mechanically operated load leveler and embodying the present invention;

FIG. 1a is a partial, side elevational view illustrating the secured relationship of the load leveling lip and the truck latch, as illustrated in FIG. 1.

FIG. 2 is a side elevational view of a portion of a trailer for a motor vehicle equipped with an ICC bumper and with the truck latch of FIG. 1 secured to the bumper and illustrating the relationship with a load leveler and a fork lift truck used for loading the motor vehicle;

FIG. 3 is a top plan view of the truck latch of FIG. 1 and illustrating the latching element in a rotated position for coupling it to a truck bumper;

DETAILED DESCRIPTION OF THE PREFERRED EMBODIMENT

Figure 4:
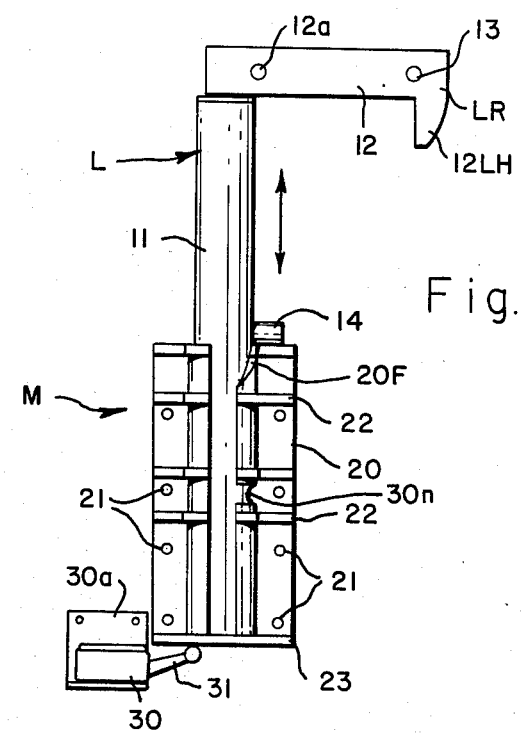
FIG. 4 is a front elevational view of the truck latch of FIG. 1.

Now referring to the drawings, the truck latch 10 will be described in detail. The truck latch 10 basically comprises latching means L having a restraining member LR extending outwardly therefrom and mounting means M for securing the truck latch to the front wall of a loading dock LD. As illustrated in FIG. 2, a motor vehicle trailer T is parked adjacent the front of the loading dock LD having the truck latch 10 secured to the front wall of the loading dock LD a preselected distance below the top of the dock. The truck latch 10 is illustrated coupled to the ICC bumper or bar B secured at the rear of the trailer T. The bumper B is of a U-shaped configuration that is suspended from the rear end of the motor vehicle with a horizontal bar extending across the back between the two vertical arms of the U configuration. The restraining member LR is illustrated in FIG. 2 in engagement with the horizontal bar for the bumper B and thereby couples the trailer to the dock LD to prevent the unexpected departure of the trailer T. A load leveler LL is provided for the dock LD and the loading lip LLL for the leveler LL is illustrated bridging the gap between the top of the dock and the floor of the trailer T to allow entry into the trailer for loading and unloading purposes. FIG. 2 also illustrates a fork lift truck entering the rear of the trailer T.

The latching means L comprises a tubular element illustrated in the form of a pipe 11 having a preselected length. The pipe 11 has the restraining member LR secured at one end thereof, the top end as illustrated in the drawings, and extending outwardly therefrom at an angle of 90 degrees. The restraining member LR comprises a flat plate 12 having a hook-like member 12LH defined at the free end thereof and dependent from the plate 12 to readily engage an ICC bumper in the relationship illustrated in FIG. 2. For the manual manipulation of the latching means L the plate 12 is provided with an aperture 12a adjacent the end where it is secured to the pipe 11. The aperture 12a is adapted to allow an individual to lift, rotate and lower the latching means L from its storage position as illustrated in FIG. 1, toward the ICC bumper B. For this purpose, a hook (not shown) which may be of conventional construction, is inserted into the aperture 12a by an individual standing on the load leveler LL for pulling the latch L upwardly, then rotating it from its storage position and then permitting it to slide downwardly into engagement with the bumper B. When the truck latch 10 is to be used with a manually operated load leveler, a restraining pin 13 may be provided adjacent the free end of the plate 12 and extends outwardly from the back side of the plate to be releasably secured into a coacting aperture for the load leveling lip LLL see FIG. 1a. In FIG.

1, the restraining pin 13 is seen secured to the load leveler lip LLL when the truck latch 10 is in its storage position and the load leveling lip LLL is in its inoperative storage position or a preselected vertical position behind the truck latch 10. This relationship prevents the lip LLL from being used until the latch L is placed in a vehicle restraining position. The latching means L further includes a stop pin 14 secured to the pipe 11 intermediate the ends thereof. In the storage position, as illustrated in FIGS. 1 and 4, the stop pin 14 is located downwardly from the restraining member LR a preselected distance so that it will rest on the top surface of the mounting means M; as best illustrated in FIG. 4.

Figure 5:
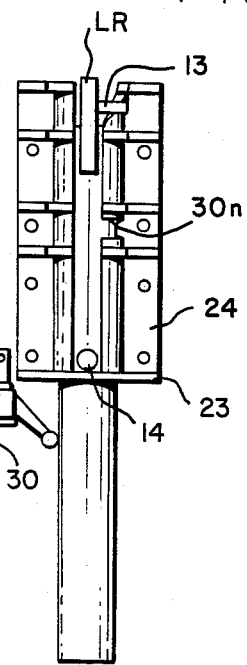
FIG. 5 is a front elevational view of the truck latch of FIG. 1 illustrating the truck latch at the bottom of its travel in the tubular configuration and the electrical switch diagramatically illustrated connected to the dock leveler controls.

The mounting means M comprises a mounting plate 20 illustrated in FIG. 1 as being secured to the front wall of the loading dock LD by a plurality of suitable fasteners 21. Loading docks are generally constructed of concrete and the fasteners for the plate 20 are selected for reliably securing the plate 20 to the concrete. The mounting means M is constructed and defined to permit the latching means L to be bidirectionally axially movable and rotatable relative to the mounting means M to permit the latching means L to be engageable with and disengageable from the ICC bumper B. For this purpose, the mounting means is constructed and defined for providing a tubular supporting structure extending vertically on the mounting means M when it is secured to the loading dock LD. The tubular supporting structure is defined by a plurality of apertured plates 22 that are secured to the plate 20 in the spaced apart relationship vertically on the plate 20 to define the tubular configuration. As illustrated in the drawings, three such plates are illustrated spaced between the top and bottom of plate 20. Each of the plates 22 has a circular configuration to slidably accommodate the pipe 11 but each has an open front end to allow the stop pin 14 to be axially slidable between the plates 22 in the vertical slot thus defined. The plates 22, then, are arranged and defined to have a circular configuration that is sized to provide the desired sliding action of the pipe 11 therein. A bottom plate 23 is secured to the bottom of the plate 20 at a right angle thereto. The plate 23 has a circular opening sized to slidably receive the pipe 11 but is not provided with an open front end for the circular opening. The stop pin 14, then, will engage the top surface of plate 23 when it is moved to the plate 23 and thereby arrests the downward travel of the pipe 11; see FIG. 5. The mounting plate 20 is also provided with a top plate 24 having a circular aperture 24a of the same configuration as the apertures for the plates 22, an open front end. The plate 24 is arranged with the aperture 24a coaxial with the apertures for the plates 22 to slidably receive the pipe 11 and permit the stop pin 14 to be rotated into the open end of the aperture 24a. The plate 24 is secured to the top surface of the loading dock LD so as to receive the pipe 11; see FIG. 1. For this purpose a plurality of fasteners 25 secure the plate 24 onto the top of the loading dock LD. In this arrangement, the mounting plate 10 is secured immediately below the top plate 24 in the relationship illustrated.

To facilitate the entry of the stop pin 14 into the above described vertical slot, the top portion of the plate 20 adjacent the top plate 24 is flared at 20F, as illustrated. In accordance with the above described arrangement, it should be evident that the latching means L may be axially moved between the plates 22 and 24 as well as being rotated therein to allow the stop pin 14 to move within the vertical slot defined by the plates 22 and 24 for permitting the bidirectional motion of the pipe 11. In the relationship illustrated, the stop pin 14 assumes its arresting position against the top plate 24 as best illustrated in FIG. 4.

Figure 6:
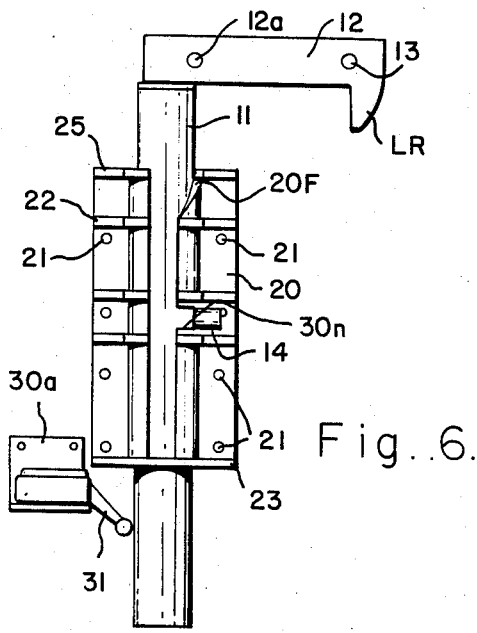
FIG. 6 is a front elevational view of the truck latch with the latch secured at a position intermediate the ends thereof in a bypass groove.

The plate 20 is also provided with a bypass groove 30n intermediate the ends thereof and which groove is adapted to receive the stop pin 14, see FIG. 6. The bypass groove 30n is preferably provided at a distance half way down from the top of the plate 20 so that the load leveler can be operated in an emergency or when the motor vehicle does not have a connectable ICC bumper, as will be described hereinafter.

The truck latch 10 may be provided with a sensing switching element which is illustrated in the form of an electro-mechanical switch 30 secured to an L-shaped plate 30a adjacent the bottom of the mounting plate 20, as illustrated. The plate 30a is suitably secured to the loading dock. The switching element 30 has an operating arm 31 for operating the switch 30. In its normal relationship, as illustrated in FIGS. 1 and 4, when the latch L is in a storage position, the operating arm 31 is located in the path of travel of the pipe 11 immediately below the bottom plate 23 and maintains the switch 30 in a nonconductive condition. The nonconductive condition of the switch, then, could provide a signal to a display device or the like that the truck latch 10 is not in a latched condition and thereby provides a visual signal of the unlatched condition. When the latching means L is operated so as to rotate it and allow the pipe 11 to travel below the bottom of the plate 23, the pipe 11 will engage the operating arm 31 and move it downwardly to operate the electro-mechanical switch 30 and thereby provide an electrical control signal therefrom. When the truck latch 10 is used with a hydraulically operated dock leveler, the electrical control signal from the switch 30 may be used to control the operation of the hydraulic controls for the leveler to assure safe and proper operation of the dock leveler only when the truck latch 10 is in its latched condition. In the commercially available hydraulic load levelers, a normally closed valve is mounted on the power unit for the dock load leveler so that the hydraulic fluid can not pass into the system through the valve for operating the levelers. The electrical signal can be coupled to this normally closed valve to maintain it in a closed condition until the switching signal is received from the switch 30 to open the normally closed valve so that the fluid can be applied to the hydraulic system for operating the load levelers. This same electrical signal from the switch 30 can be connected to the electrical power supply for the hydraulic system so that the power to the load leveler can not be applied from the hydraulic motor without the correct signal from the switch 30. As in the prior art, the electrical signal can be used to control a pair of red and green lights on both the inside and outside of the loading dock to tell the motor vehicle operator or the warehouse personnel when the load leveler is safe for operation. When the electrical signal is utilized for controlling the operation of a hydraulic load leveler and a motor vehicle is parked adjacent the loading dock but does not have a bumper that is connectable to the latch 10, or in an emergency condition exits that require the operation of the load leveler, the bypass groove 30n is utilized. Under each of the aforementioned conditions, the latch member L is operated in a normal fashion to move the stop pin 14 from its storage position and downwardly in the vertical slot for the pin 14 until it is adjacent the bypass groove 30n and is then rotated to be slidably received into the groove 30n to arrest the downward travel of the pipe 11. In this relationship, the electrical switch 30 is operated as if the vehicle was restrained to permit the operation of the load leveler; see FIG. 6. Under these conditions, the operating personnel must be cognizant that the motor vehicle is not latched or restrained.

I claim:

1. A device for restraining a motor vehicle having a predetermined style bumper by releasably coupling the bumper to a loading dock, said device comprising latching means having a restraining member extending outwardly therefrom and adapted for sliding and rotary movement to position the restraining member over said bumper to releasably interlock with said bumper upon engagement therewith and slidably movable out of engagement with said bumper to release same, and means for mounting said latching means to permit the latching means to be bidirectionally axially movable and rotatable relative to the mounting means to permit the latching means to engage and disengage said bumper, said mounting means permitting the latching means to be rotated to a position out of the path of said motor vehicle, said mounting means including means for securing same to a loading dock at a preselected location on a side wall thereof.

2. A device for restraining a motor vehicle as defined in claim 1 including switching means secured to said mounting means for sensing the axial movement of the latching means and operative for providing an electrical control signal when the latching means is in engagement with said bumper for signalling said relationship and signalling the disengagement of the bumper and said latching means.

3. A restraining device adapted to be mounted on a loading dock for use in conjunction with a truck or trailer parked adjacent the dock, the truck or trailer being provided with a predetermined style of bumper secured thereto for use with a restraining device to prevent the unexpected departure of the truck or trailer away from the loading dock including during the loading or unloading of the truck or trailer, said restraining device comprising means for mounting the restraining device to a loading dock, said means being constructed and defined for providing a tubular supporting structure extending vertically thereon when mounted to a loading dock, and latching means comprising a tubular member sized to be slidably and rotatably mounted in said tubular supporting structure for said mounting means and a latch element secured adjacent one end of the tubular element and extending outwardly from the longitudinal axis of the tubular supporting structure and said mounting means, said latching means being capable of being axially movable in said tubular configuration for said mounting means and rotatable therein to permit the latch element to be positioned over and coupled to said bumper for a truck or trailer parked adjacent the loading dock in a restraining position with the bumper to prevent the unexpected departure of the truck or trailer away from the loading dock and to permit the latch element to be movable away from the bumper restraining position to decouple said bumper and thereby release the truck or trailer from said latching means, said latching means being normally positioned with the latch element rotated to a storage position substantially aligned along said loading dock so as not to protrude forwardly from said mounting means.

4. A restraining device adapted to be mounted to a loading dock as defined in claim 3 including stop means carried by said latching means and spaced a preselected distance from said latch element for arresting the downward travel of said latching means in said tubular configuration, said stop means extending outwardly from the longitudinal axis of the tubular member an extent to engage the tubular supporting structure adajcent its upper end when the latch element has been rotated to said storage position.

5. A restraining device adapted to be mounted to a loading dock as defined in claim 4 wherein said tubular supporting structure of the mounting means is constructed and defined with a longitudinal slot for slidably accommodating said stop means to permit said stop means to be rotatably moved from engagement with the tubular supporting structure to be slidable within said longitudinal slot to permit the latch element to be placed in said restraining position with the bumper.

6. A restraining device adapted to be mounted to a loading dock as defined in claim 5 wherein said stop means comprises a pin extending outwardly from the longitudinal axis of the tubular supporting structure in the same direction as said latch element.

7. A restraining device adapted to be mounted to a loading dock as defined in claims 3 or 4 wherein the latch element for the latching means comprises a flat element secured adjacent one end of the tubular member and having a hook-like configuration at the end spaced from the tubular element for releasably latching said bumper when moved over said bumper.

8. A restraining device adapted to be mounted on a loading dock as defined in claim 3 including switching means mounted adjacent the end of the tubular element opposite to said one end securing the latch element for sensing the axial movement of the tubular element and operative for providing an electrical signal therefrom when the tubular element has been moved to said bumper restraining position.

9. A restraining device adapted to be mounted on a a loading dock as defined in claim 8 wherein said end of the tubular element is movable out of said mounting means when the latch element is moved towards said bumper to be coupled thereto, and said switching means comprises electro-mechanical switching means having a sensing arm extending outwardly therefrom for operating the switching means to provide an electrical signal therefrom, said sensing arm being positioned in the path of travel of said movable element to be movable when engaged by said tubular element for operating said switching means to provide said electrical signal, said sensing arm being arranged to normally be spaced from said tubular element when the latch element is in said storage position and the switching means is inoperative.

10. A restraining device adapted to be mounted on a loading dock as defined in claim 3 wherein said latch element includes means for permitting the latching means to be manually manipulated by an individual on the loading dock.

11. A restraining device adapted to be mounted on a loading dock as defined in claim 3 wherein the loading dock is equipped with a loading dock leveler mounted on the loading dock, the leveler including a loading lip arranged in a substantially vertical, non-loading position when a truck or trailer is not to be loaded or unloaded and movable to a substantially horizontal position into a truck or trailer to be loaded or unloaded, said latch element being normally maintained at a position above the loading dock and in front of the loading lip when the latter is arranged in said nonloading position, said latch element and said loading lip being constructed and defined relative to one another to be releasably secured together to prevent the movement of said loading lip until the latch element has been moved to a bumper restraining position.

12. A restraining device adapted to be mounted on a loading dock as defined in claim 11 wherein said lip and said latch element are defined wherein one of the elements includes a restraining pin for coaction with a restraining aperture for the other one of the elements.

13. A restraining device adapted to be mounted on a loading dock as defined in claim 11 wherein the latch element includes a restraining pin extending outwardly of the element and the loading lip includes an aperture for slidably receiving said restraining pin for the latch element when the latter is positioned above the loading dock.

14. A restraining device adapted to be mounted to a loading dock as defined in claim 5 wherein said tubular supporting structure includes a groove intermediate the ends constructed and defined for accommodating said stop means and restrain the travel of said latching means in said tubular configuration when the latching means is rotated to a position to be rotated into said groove.

* * * * *